(12) United States Patent
Senbokuya et al.

(10) Patent No.: US 6,616,783 B2
(45) Date of Patent: Sep. 9, 2003

(54) METHOD OF PRODUCING TIRE CARCASS

(75) Inventors: Takashi Senbokuya, Kodaira (JP); Nobuyuki Suda, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/827,938

(22) Filed: Apr. 9, 2001

(65) Prior Publication Data

US 2001/0045254 A1 Nov. 29, 2001

(30) Foreign Application Priority Data

Apr. 10, 2000 (JP) ........................................ 2000-108054

(51) Int. Cl.$^7$ .............................................. B29D 30/08
(52) U.S. Cl. ...................... 156/117; 156/133; 156/134; 156/179; 156/193; 156/264; 156/906
(58) Field of Search ................... 156/117, 123, 156/133, 134, 179, 193, 264, 266, 906, 907; 264/174.11, 171.24; 152/510, 548, 560

(56) References Cited

U.S. PATENT DOCUMENTS

| | | | |
|---|---|---|---|
| 3,237,673 A | * | 3/1966 | Ward ........................... 156/134 |
| 3,778,329 A | | 12/1973 | Alderfer |
| 3,826,297 A | * | 7/1974 | Alderfer ...................... 152/560 |
| 4,359,354 A | | 11/1982 | Böhm |
| 4,776,909 A | * | 10/1988 | Bohm et al. ................. 156/117 |
| 4,877,468 A | | 10/1989 | Siegenthaler |
| 5,292,472 A | | 3/1994 | Tompkins |
| 5,328,532 A | * | 7/1994 | Azuma et al. ............... 156/134 |
| 5,354,404 A | | 10/1994 | Benjamin |

FOREIGN PATENT DOCUMENTS

| | | |
|---|---|---|
| EP | 0 246 497 A2 | 11/1987 |
| EP | 0 740 999 A2 | 11/1996 |
| EP | 0 919 406 A1 | 6/1999 |
| GB | 960 488 | 6/1964 |

* cited by examiner

Primary Examiner—Geoffrey L. Knable
(74) Attorney, Agent, or Firm—Oliff & Berridge, PLC

(57) ABSTRACT

A tire carcass is produced by a method in which a narrow carcass ply member including a plurality of cords coated by, and embedded in a rubber material is extruded from an extruder, and an inner liner member is simultaneously extruded from the extruder integrally with the carcass ply member. A narrow band-shaped laminated body is thereby efficiently formed, in which the inner liner member is integral with the carcass ply member.

10 Claims, 5 Drawing Sheets

METHOD OF PRODUCING TIRE CARCASS

BACKGROUND OF THE INVENTION

1. Field of the Invention

The present invention relates to a method of producing a tire carcass.

2. Description of the Related Art

Conventionally, in order to produce a tire carcass, a wide band-shaped member is formed by extruding a rubber from a large-sized extruder together with a plurality of cords that are coated by, and embedded in the rubber. The band-shaped member is then cut into pieces of a predetermined length by a dedicated cutter, and these pieces are successively joined with each other along their side edges that same parallel to the embedded cords, to thereby form a band-like carcass ply member in which the embedded cords are oriented in the width direction. The carcass ply member so prepared is wound around a roll and stored as a rolled body.

As another tire component member, an inner liner member is also formed by an extruder into a band-shaped member of a predetermined width, and wound around another roll and stored also as a rolled body. In this way, ply members and inner liner members have been conventionally produced separately and stored as separate rolled bodies. In a tire building process, the inner liner member is wound around a shaping drum and the ply member is then wound around the inner liner member, to thereby produce a cylindrical carcass.

The production of carcass ply members as described above requires many devices such as a large sized calender for forming a wide band-shaped member while coating rubber thereon, as well as a dedicated cutter, a joining device and a winding device, thereby resulting in large sized facilities and increased production man-hours and facility cost.

Furthermore, since carcass ply members and inner liner members are stored as rolled bodies, there may be caused fluctuation, for example, in the tire building precision due to deformation of the members or changes in tackiness thereof, thereby affecting on the tire quality.

There is also known a direct method in which a narrow band-shaped carcass ply member is formed by an extruder, and cut into pieces of a predetermined length, which are then successively adhered to or spirally wound around a drum. However, even in this case, the inner liner members are separately produced and wound around the drum in advance, thereby requiring a separate production step for the inner liner members as well as storage of the inner liner members as rolled bodies.

SUMMARY OF THE INVENTION

It is therefore an object of the present invention to eliminate the problems of the prior art as noted above, and provide an improved method of producing a tire carcass, which allows to downsize the facilities and reduce the production man-hours, while allowing production of a tire carcass of high quality at a reduced cost.

To achieve the aforementioned object, according to the present invention, there is provided a method of producing a tire carcass, comprising the steps of:

extruding from an extruder a narrow carcass ply member in which a plurality of cords are embedded in, and coated by a rubber material; and simultaneously extruding from said extruder an inner liner member integrally with the carcass ply member, thereby forming a narrow band-shaped laminated body in which the inner liner member is integral with the carcass ply member.

According to the present invention, the double-layered band-shaped laminated body comprised of the carcass ply member and the inner liner member is formed by a simultaneous extrusion from an extruder, thereby allowing downsizing of the extruder as a whole. Furthermore, it is unnecessary to separately store the ply member and inner liner member as respective rolled bodies. This also allows the downsizing of the entire facilities, reduction of the production man-hours and reduction of the cost for the facilities. Furthermore, as the storage of rolled bodies is unnecessary, it is possible to avoid fluctuation, for example, in the tire building precision due to deformation of the members or change in tackiness thereof. It is thus possible to provide an improved quality of the product tires.

It is preferred that the inner liner member is extruded to have a required thickness at a required location of the band-shaped laminated body. In this instance, the carcass ply member is only locally formed with the inner liner member to minimize waste of the materials and reduce the cost.

The inner liner member may be intermittently extruded with a predetermined pitch in the extruding direction of said ply member. In this instance, the band-shaped laminated body has portions formed with the ply member and the inner liner member as a double-layered structure, and other portions that are of a single-layered structure without the inner liner member. The laminated body may be successively cut at the single-layered portions at a constant pitch into pieces which are then applied to the outer peripheral surface of a drum, thereby effectively producing a cylindrical carcass having an inner liner member only at a required portion.

The method of producing a tire carcass according to the present invention may further comprise the steps of cutting said band-shaped laminated body into pieces of a predetermined length, and applying said pieces onto the outer peripheral surface of a shaping drum, with the inner liner members and the ply members oriented radially inwards and outwards, respectively, while bringing said pieces into a side-by-side contact with each other, thereby forming a cylindrical carcass on the shaping drum. In this instance, a cylindrical carcass having an inner liner as the inner layer is formed directly on the shaping drum, to thereby efficiently produce tires. A resin sheet may be wound around the shaping drum, before the pieces are wound around the shaping drum. The resin sheet provides the function of a bladder upon vulcanization of a green tire, thereby realizing a so-called bladderless vulcanization.

Alternatively, the method of producing a tire carcass according to the present invention may further comprised the steps of cutting said band-shaped laminated body into pieces of a predetermined length, and arranging said pieces on a flat support so that said pieces are brought into a side-by-side contact with each other, to thereby form a flat carcass member. In this instance, it is possible to efficiently form the flat laminated body provided integrally with an inner liner member.

The band-shaped laminated body may be formed, along it side edges, with thin portions. In this instance, when the band-shaped laminated body is cut into pieces of a predetermined length and these pieces are wound on a drum in its circumferential direction, the side edges of the adjacent pieces may be in contact with each other or mutually overlapped at the thin portions so as to positively join the pieces without forming stepped portions, thereby improving the quality of the carcass.

The method of producing a tire carcass according to the present invention may further comprise the steps of spirally winding said band-shaped laminated body onto a drum and thereby forming a cylindrical member on the drum, cutting said cylindrical member in the axial direction of said drum, and subsequently developing the cylindrical member and thereby forming a flat carcass member. In this instance, it is possible to efficiently produce a double-layered flat laminated body including the carcass ply member and the inner liner member, and to wind the laminated body around a shaping drum thereby improving the productivity of the carcass.

BRIEF DESCRIPTION OF THE DRAWINGS

The present invention will be described hereinafter with reference to some preferred embodiments shown in the accompanying drawings, in which.

DESCRIPTION OF THE PREFERRED EMBODIMENTS

Figure 1:
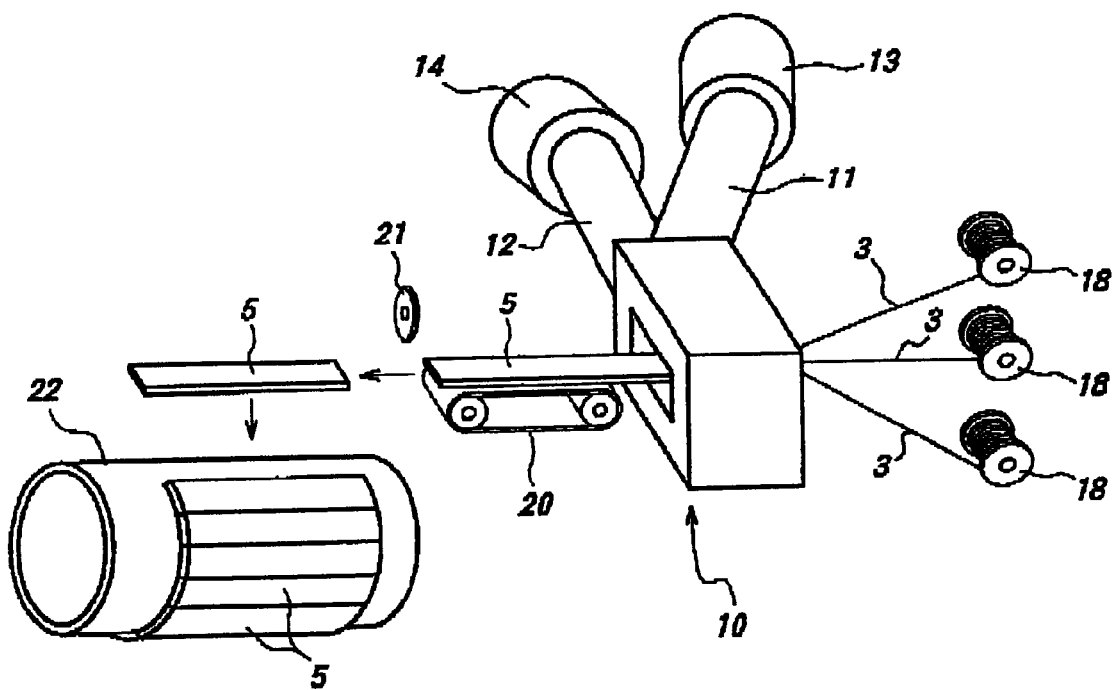
FIG. 1 is a schematic view showing the method according to one embodiment of the present invention.

Referring now to the drawings, FIG. 1 shows the process for producing a carcass according to one embodiment of the present invention. A two-layer type extruder 10 is used in the process and includes two cylinders 11, 12 provided with internal screws and supplied with materials from hoppers 13, 14, respectively.

The material to be supplied from the hopper 13 is a rubber material 1 for the carcass ply. The rubber material 1 supplied into the cylinder 11 is carried up to the tip end by the rotation of the screw and introduced into a head 15. Further, the material to be supplied from the hopper 14 is a rubber material 2 for the inner liner. The rubber material 2 supplied into the cylinder 12 is carried to the tip end of the cylinder 12 by the rotation of the screw and introduced into the bead 15.

Figure 2:
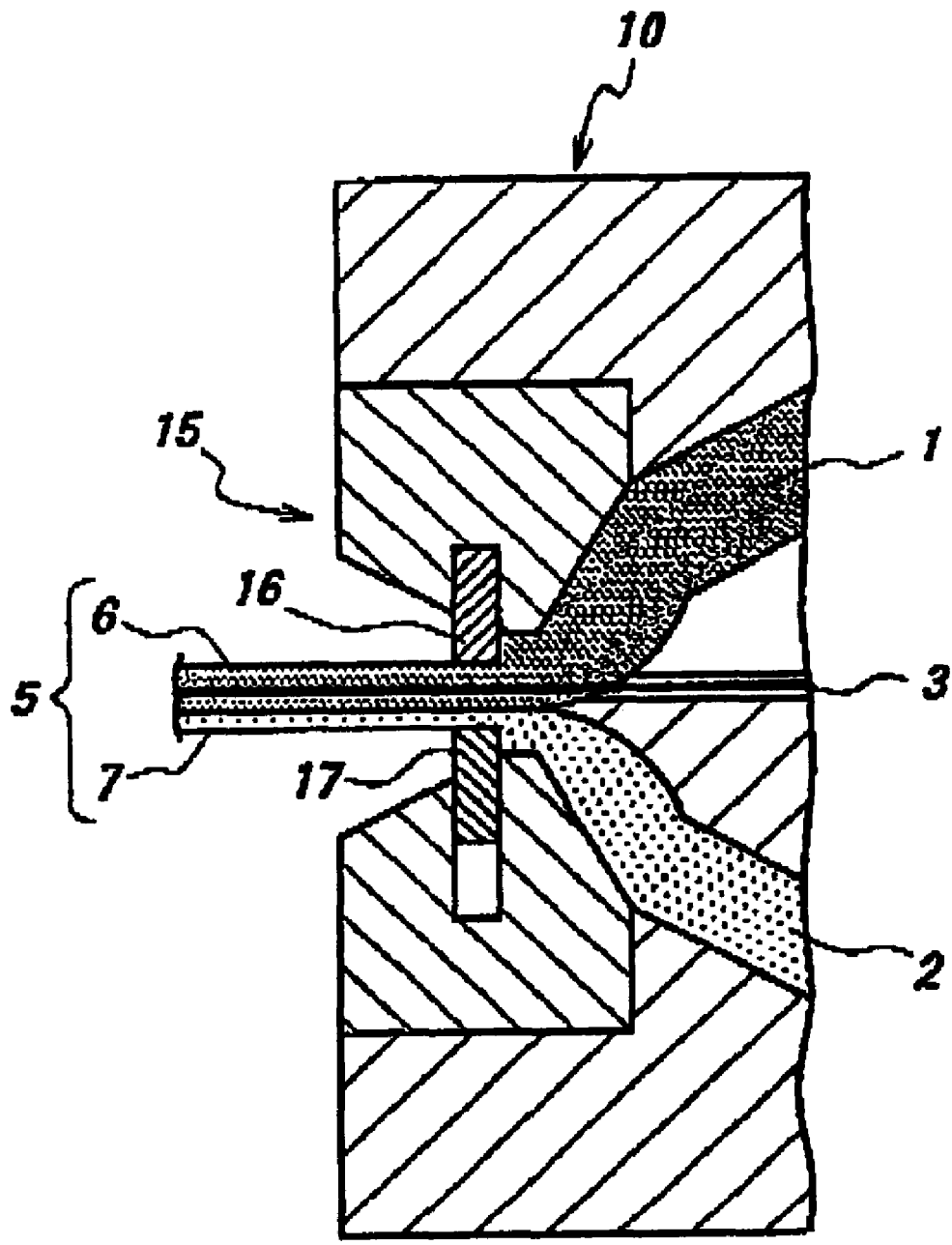
FIG. 2 is a cross-sectional view of a head part of an extruder.

The extruder 10 is further supplied with cords 3, which may be steel cords or organic fiber cords, from a plurality of reels 18. Referring to FIG. 2, the rubber material 1 for the carcass ply is introduced from the upper side into the head 15 so as to cover and embed the cords 3, while the rubber material 2 for the inner ply is introduced from the lower side into the head 15. These rubber materials 1 and 2 are merged with each other before upper and lower dies 16, 17 and extruded from an opening defined by the dies 16, 17, as a double-layered structure comprised of upper and lower layers.

The upper and lower dies 16, 17 cooperate with each other to form a flat rectangular opening so that the rubber materials 1 and 2 are simultaneously extruded into a band-shaped laminate body from the dies 16, 17, wherein an inner liner member 7 is integrally adhered to the underside of a band-shaped ply member 6.

Figure 5:
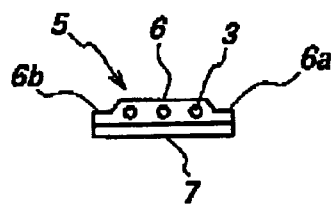
FIG. 5 is a front view of the band-shaped laminated body.

The upper die 16 is fixedly secured to the bead 15 and defines an opening having a slightly reduced height at both side regions so as to reduce the thickness of the carcass ply member 6 at its both side edges 6a, 6b (see FIG. 5). The lower die 17 is vertically movable to change the thickness of the inner liner member 7 of the lower layer by adjusting the height of the lower die 17. It is assumed that when the lower die 17 is set at its maximum height position, the extrusion of the rubber material 2 for the inner-liner is stopped.

Figure 3:
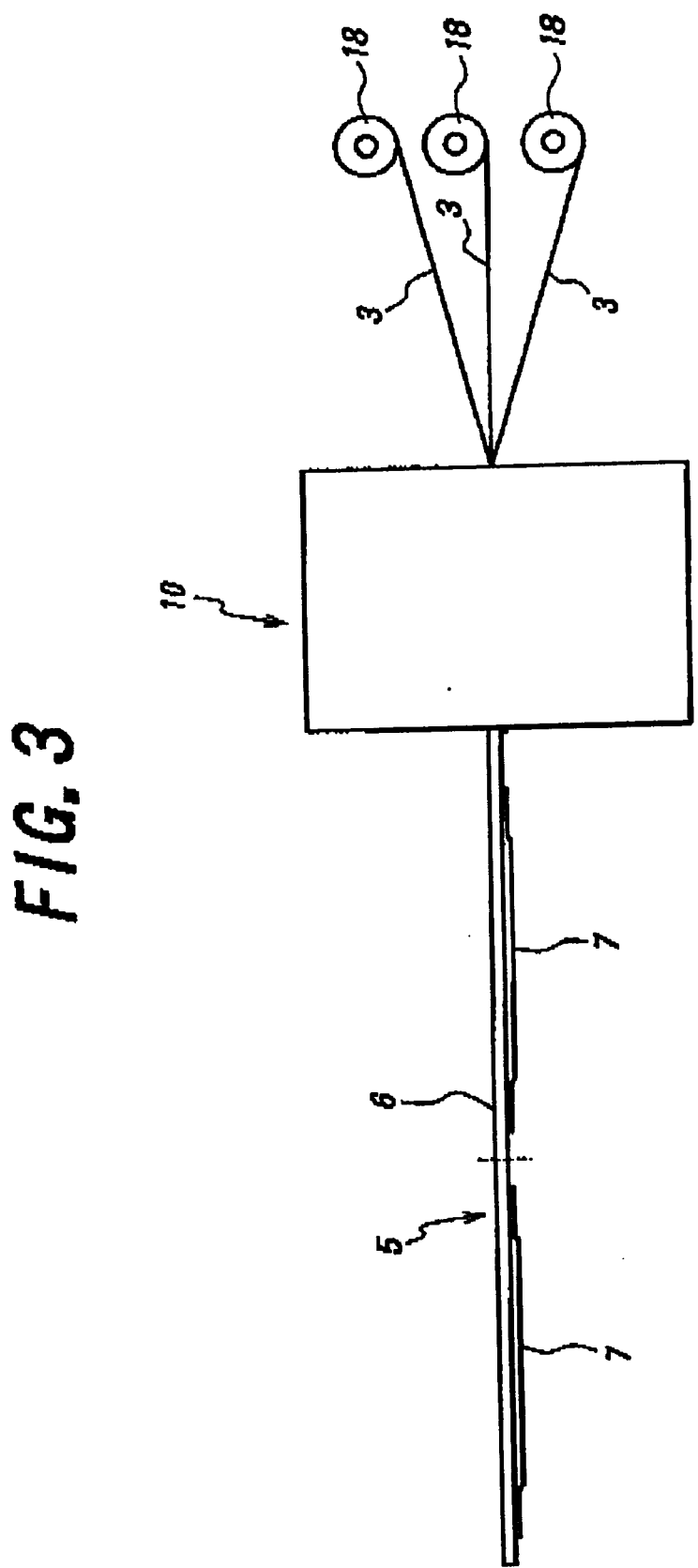
FIG. 3 is a schematic side view showing a band-shaped laminated body that is being extruded from the extruder.

The vertical movement of the lower die 17 is periodically controlled to form the inner liner member 7 with a required thickness at the underside of the carcass ply member 6. Thus, the inner liner member 7 is formed at a constant pitch along the underside of the band-shaped ply member 6, as shown in FIG. 3. The inner liner member 7 thus formed has a small thickness at its longitudinal end portions, and a large thickness at its longitudinal center portion. The inner liner members 7 having the same shape are successively formed at a constant pitch.

The band-shaped laminated body 5 thus extruded is placed on a drawing conveyer 20 and drawn out thereby, as shown in FIG. 1. The band-shaped laminated body 5 is then cut into pieces of a predetermined length by a cutter 21 provided on the downstream side. The cutting pitch is equal to the pitch of the inner liner member 7 formed along the underside of the band-shaped ply member 6, and the cutting is performed at the intermediate position between adjacent two inner liner members 7, 7.

Figure 4:
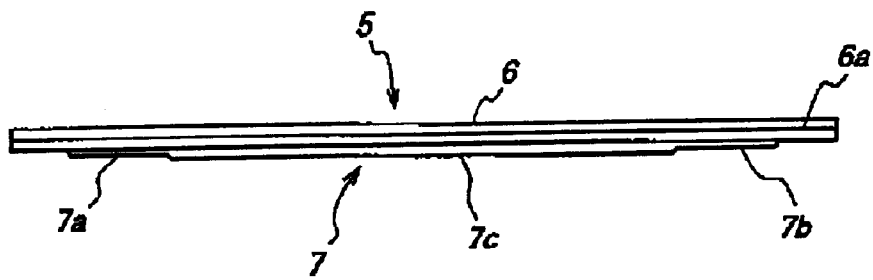
FIG. 4 is a side view of a band-shaped laminated body cut into pieces of a predetermined length.

As shown in FIGS. 4 and 5, the piece obtained by cutting the band-shaped laminated body 5 has a constant length as seen in the longitudinal direction. The band-shaped carcass ply member 6 as the upper layer embeds a plurality of cords 3 oriented in the longitudinal direction, and has the side edges 6a, 6b with a small thickness. The inner liner member 7 as the lower layer is adhered to the surface of the carcass ply member 6 except for the front and rear ends thereof. The inner liner member 7 itself has front and rear ends 7a, 7b of a small thickness and a center portion 7c of a large thickness.

Figure 6:
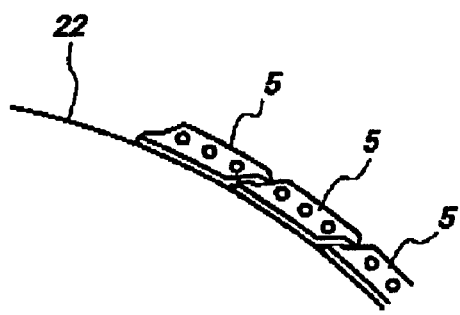
FIG. 6 is a view showing the band-shaped laminated bodies that are being successively adhered onto a shaping drum.

As shown in FIG. 1, the band-shaped laminated bodies 5 having a constant length are arranged on the outer peripheral surface of a shaping drum 22 successively in its circumferential direction, with the inner liner member 7 directed inwards and the carcass ply member 6 directed outwards, and with the thin side edges of adjacent band-shaped laminated bodies 5 by overlapping with each other to join the laminated bodies 5 (see FIG. 6).

Figure 7:
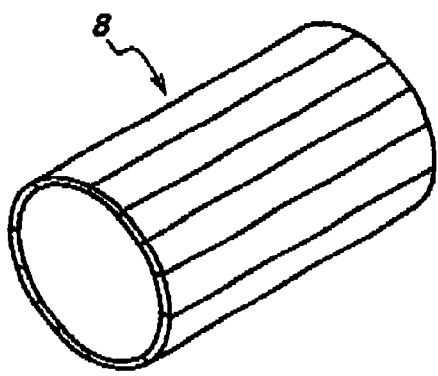
FIG. 7 is a perspective view of the produced carcass.

Upon arranging and joining the band-shaped laminated bodies 5 to one another over the entire periphery of the shaping drum 22, there is produced a cylindrical carcass 8 as shown in FIG. 7. As the band-shaped laminated bodies 5 are joined with each other by overlapping the thin side edges, the joining portion is preferably stitched by a stitching roll or the like to make the thickness uniform along the joining portion. This is an effective measure to prevent formation of any stepped portions and improve the quality of the carcass 8.

As described above, the carcass ply member 6 and the inner liner member 7 are simultaneously extruded as a double-layered, band-shaped laminated body 5. It is thus possible to downsize the extruder 10, and remove the necessity for the storage of the carcass ply member 6 and inner liner member 7 as separate rolled bodies. Furthermore, the band-shaped laminated body 5 can be directly applied onto the shaping drum 22 to directly produce the carcass. It is thus possible to reduce the production man-hours, downsize the facilities and thereby reduce the cost of facilities.

Furthermore, it is unnecessary to store separate rolled bodies for the carcass ply member 6 and the inner liner member 7, respectively. This is highly important to prevent fluctuation in the tire building precision due to deformation or change in tackiness of the members, thereby realizing an improved quality of the product tires.

The band-shaped laminated body 5 includes the carcass ply member 6 which is formed with the inner liner member 7 only locally, at a required position and with a required thickness. This is an effective measure to minimize waste of the material and reduce the cost.

The inner liner members 7 are successively formed at a constant pitch on the band-shaped carcass ply member 6. The carcass ply member 6 is successively cut with the same pitch at the intermediate position between adjacent two inner liner members 7, 7, and the cut pieces are then successively applied onto the outer peripheral surface of the shaping drum 22. This makes it possible to efficiently produce a cylindrical carcass 8 formed integrally with the inner liner at the required positions.

It is preferred that a polyethylene sheet is previously wound on the shaping drum 22, so that band-shaped laminated bodies 5 are successively applied and adhered to the polyethylene sheet to thereby form the cylindrical carcass 8. In this case, polyethylene sheet on the inner periphery of the carcass 8 provides the function of a bladder upon vulcanization of a green tire, realizing a so-called bladderless vulcanization.

In the above-mentioned embodiment, the band-shaped laminated bodies 5 are arranged on the outer peripheral surface of the shaping drum 22 so as to form the cylindrical carcass 8. However, it is also possible to cut the band-shaped laminated body 5 into pieces of a predetermined length and to arrange these pieces on a flat support so that the pieces are in contact with one another, to thereby form a double-layered flat laminated body. The flat laminated body may be wound around a shaping drum to thereby form a carcass. In this instance, it is necessary to wind the laminated body so that the embedded cords are oriented in the axial direction of the shaping drum.

Figure 8:
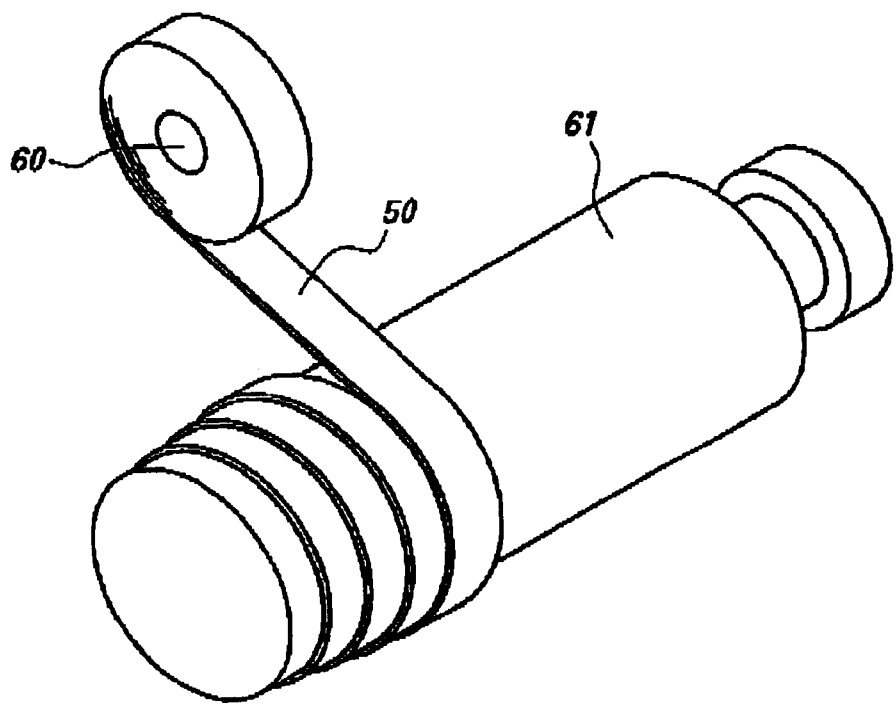
FIGS. 8 and 9 are views showing the producing steps of the laminated body according to another embodiment.
Figure 9:
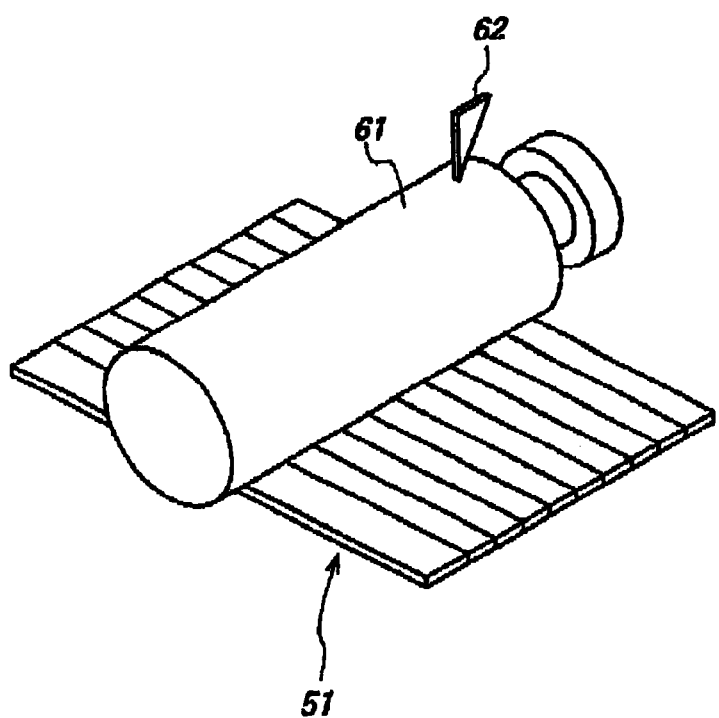

Another embodiment of the present invention will be explained below with reference to FIGS. 8 and 9. A band-shaped laminated body 50 wound on a roll 60 is comprised of a carcass ply member embedding cords and formed integrally with an inner liner member uniformly over the entire surface. The laminated body 50 is supplied from the roll 60 to a drum 61, as shown in FIG. 8. The drum 61 is rotated while simultaneously moving the roll 60 in the axial direction relative to the drum 61, to thereby spirally wind the laminated body 50 around the entire surface of tee drum 61 so that both side edges of the band-shaped laminated body 50 are overlapped with each other. Thus formed cylindrical member is cut in the axial direction by a cutter 62 and then developed as shown in FIG. 9, to thereby produce a flat laminated body 51. The flat laminated body 51 has a double-layered structure comprised of the carcass ply member and the inner liner member. Thus, when a carcass is formed by winding the laminated body 51 around a shaping drum, it is unnecessary to wind a carcass ply member after winding of an inner liner member, thereby improving the productivity of a double-layered carcass.

While the present invention has been described above with reference to certain preferred embodiments, it is of course that various changes and/or modifications may be made without departing from the scope of the invention as defined by the appended claims.

What is claimed is:

1. A method of producing a tire carcass, comprising the steps of:

extruding from an extruder a narrow carcass ply member in which a plurality of cords are embedded in, and coated by a rubber material; and simultaneously extruding from said extruder an inner liner member integrally with the carcass ply member, thereby forming a narrow band-shaped laminated body in which the inner liner member is integral with the carcass ply member.

2. A method of producing a tire carcass according to claim 1, wherein said inner liner member is extruded to have a required thickness that varies with a longitudinal location of the band-shaped laminated body.

3. A method of producing a tire carcass according to claim 1, wherein said inner liner member is intermittently extruded with a predetermined pitch in the extruding direction of said ply member.

4. A method of producing a tire carcass according to claim 1, further comprising the steps of:

cutting said band-shaped laminated body into pieces of a predetermined length; and applying said pieces onto an outer peripheral surface of a shaping drum, with the inner liner members and the ply members oriented radially inwards and outwards, respectively, while bringing said pieces into a side-by-side contact with each other, thereby forming a cylindrical carcass on the shaping drum.

5. A method of producing a tire carcass according to claim 4, further comprising the step of winding a resin sheet around the shaping drum, before said pieces are wound around the shaping drum.

6. A method of producing a tire carcass according to claim 1, further comprising the steps of:

cutting said band-shaped laminated body into pieces of a predetermined length; and arranging said pieces on a flat support so that said pieces are brought into a side-by-side contact with each other, to thereby form a flat carcass member.

7. A method of producing a tire carcass according to claim 4, wherein the said band-shaped laminated body is formed, along its side edges, with thin portions.

8. A method of producing a tire carcass according to claim 1, further comprising the steps of:

spirally winding said band-shaped laminated body onto a drum and thereby forming a cylindrical member on the drum;

cutting said cylindrical member in the axial direction of said drum; and subsequently developing the cylindrical member and thereby forming a flat carcass member.

9. A method of producing a tire carcass according to claim 2, wherein said inner liner member is intermittently extruded with a predetermined pitch in the extruding direction of said ply member.

10. A method of producing a tire carcass according to claim 6, wherein the said band-shaped laminated body is formed, along its side edges, with thin portions.

* * * * *